US009674229B2

(12) United States Patent
Noldus et al.

(10) Patent No.: US 9,674,229 B2
(45) Date of Patent: Jun. 6, 2017

(54) METHOD AND APPARATUS FOR CONTINUING THE EXCHANGE OF A MEDIA DATA STREAM BEYOND TERMINATION OF A CORRESPONDING SESSION INITIATION PROTOCOL DIALOGUE

(75) Inventors: Rogier August Caspar Joseph Noldus, Goirle (NL); Jos Den Hartog, Capelle aan den IJssel (NL)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 367 days.

(21) Appl. No.: 14/131,211

(22) PCT Filed: Jul. 26, 2011

(86) PCT No.: PCT/EP2011/062844
§ 371 (c)(1),
(2), (4) Date: Apr. 30, 2014

(87) PCT Pub. No.: WO2013/013707
PCT Pub. Date: Jan. 31, 2013

(65) Prior Publication Data
US 2014/0310421 A1    Oct. 16, 2014

(51) Int. Cl.
*G06F 15/16*  (2006.01)
*H04L 29/06*  (2006.01)
(52) U.S. Cl.
CPC ...... *H04L 65/1006* (2013.01); *H04L 65/1069* (2013.01); *H04L 65/1096* (2013.01)
(58) Field of Classification Search
USPC ................ 709/228, 220, 222, 223, 224, 230
See application file for complete search history.

(56) References Cited

U.S. PATENT DOCUMENTS

| 8,849,184 B1* | 9/2014 | Cannon | H04N 21/4126 455/3.01 |
| 2004/0139088 A1* | 7/2004 | Mandato | H04L 12/5695 |

(Continued)

FOREIGN PATENT DOCUMENTS

| CN | 1756256 A | 4/2006 |
| EP | 1798947 A1 | 6/2007 |

OTHER PUBLICATIONS

Camarillo, G., et al., "Early Media and Ringing Tone Generation in the Session Initiation Protocol (SIP)", RFC 3960. The Internet Society. Network Working Group; Request for Comments: 3960; Informational. Dec. 2004. pp. 1-13.

(Continued)

*Primary Examiner* — Lan-Dai T Truong
(74) *Attorney, Agent, or Firm* — Murphy, Bilak & Homiller, PLLC

(57) ABSTRACT

A method of operating a first communication device (3) for receiving a media data stream (64) from at least one second communication device (5) in a telecommunications system. The first communication device (3) exchanging with the at least one second communication device (5) Session Initiation Protocol, SIP, messages (60, 62, 63, 64, 67, 70) during a SIP dialogue. The SIP messages (67, 70) including a late media indicator (68, 71) that includes an indication that the media stream (64) continues (72) after the SIP dialogue has terminated, or an indication (75) of support of receiving media stream after the SIP dialogue has terminated. The SIP dialogue controls the media data stream (64, 72). The first communication device (3) receives the media data stream (64, 72) from the second communication device (5). The first communication device (3) continues to receive the media data stream (72) after the SIP dialogue has ended.

15 Claims, 7 Drawing Sheets

(56) References Cited

U.S. PATENT DOCUMENTS

2004/0187109 A1    9/2004  Ross et al.
2012/0259925 A1*  10/2012  Braudes ............... H04L 51/16
                                                    709/206

OTHER PUBLICATIONS

Handley, M., et al., "SDP: Session Description Protocol", RFC 4566. The Internet Society. Network Working Group; Request for Comments: 4566; Obsoletes: 2327, 3266; Standards Track. Jul. 2006. pp. 1-49.
Rosenburg, J., et al., "SIP: Session Initiation Protocol", RFC 3261; Network Working Group. Standards Track. The Internet Society. Jun. 2002. pp. 1-269.
Schulzrinne, H., et al., "Real Time Streaming Protocol (RTSP)", RFC 2326. Network Working Group; Request for Comments: 2326. Standards Track. Apr. 1998. pp. 1-92.
Schulzrinne, H., et al., "RTP: A Transport Protocol for Real-Time Applications", RFC 3550. Network Working Group; Request for Comments: 3550; Request for Comments 3550. The Internet Society. Jul. 2003. 1-104.
3rd Generation Partnership Project, "3GPP TS 29.209 V6.7.0 (Jun. 2007)," 3rd Generation Partnership Project; Technical Specification Group Core Network and Terminals; Policy control over Gq interface (Release 6). Jun. 2007. pp. 1-25.

\* cited by examiner

METHOD AND APPARATUS FOR CONTINUING THE EXCHANGE OF A MEDIA DATA STREAM BEYOND TERMINATION OF A CORRESPONDING SESSION INITIATION PROTOCOL DIALOGUE

FIELD OF THE INVENTION

The present invention relates to media handling in a telecommunications system and, in particular, to a method of operating a first communication device for receiving a media data stream from at least one second communication device in the telecommunications system.

BACKGROUND

An IP Multimedia Subsystem, IMS, communications network is an example of a telecommunications system arranged for media exchange. Within the framework of IMS, a media session has a dialogue associated with it. The media descriptors related to a media session are exchanged by the dialogue between the respective end points of the dialogue. A dialogue is established within a Session Initiation Protocol, SIP, session. The SIP dialogue within a SIP session controls the media session taking place in the user plane of the IMS network.

In IMS there is a strict separation between control plane on one hand, and media plane or user plane on the other hand. SIP type signalling is conveyed through the control plane and controls the media session. On the other hand, media is transported through the user plane. Control plane signalling and user plane messages may be (but not necessarily are) transported through a different infrastructure in the IMS network, and thus may be subject to different routing paths between their respective end points.

FIG. 1 schematically illustrates the relation between a session initiation protocol session, and a session initiation protocol dialogue within the SIP session and, on the other hand, a media session. Between two end points User Agent-A, UA-A 3, and User Agent-B, UA-B 5, a SIP session 8 may convey multiple SIP dialogues between UA-A 3 and UA-B 5. In the example of FIG. 1, a session initiation protocol dialogue 9 is conveyed through the SIP session 8. The SIP dialogue 9 carries SIP signalling required for controlling a media session 10 also taking place between UA-A 3 and UA-B 5. This is schematically indicated by a dashed arrow 12 associating SIP dialogue 9 and media session 10.

The separation between the user plane and the control plane is also schematically illustrated in FIG. 2. In FIG. 2, UA-A 3 comprises a communication unit 16 and UA-B 5 comprises a communication unit 8. SIP signalling is conveyed through control plane 8, while the media session using a Real-time Transport Protocol, RTP, is conveyed through user plane 10. The IMS network is schematically indicated by a cloud 15 in FIG. 2.

As already mentioned above, a single SIP session may comprise multiple SIP dialogues relating to multiple media sessions in the user plane. An example of this can exist in situations wherein a SIP proxy server is involved, which applies the principle of "forking" in an attempt to find a recipient by searching multiple locations. Between the proxy server and each of the user agents approached by the proxy server, SIP sessions may exist conveying a SIP dialogue between the calling user agent and each of the respective potential recipients. Since the proxy server approaches multiple potential recipient user agents, SIP dialogues take place between the calling user agent and each of the potential recipient user agents approached by the proxy server. Between the proxy server and each of the recipient user agents, a single SIP session per recipient user agent conveys the respective SIP dialogue to that respective potential recipient user agent. Between the proxy and the calling user agent, a single SIP session is established which conveys all of the SIP dialogues between the calling user agent and each respective potential recipient user agent approached by the proxy server.

Accordingly, the SIP session between the calling user agent and the proxy server conveys a plurality of SIP dialogues, which are relayed by the proxy server to each of the respective potential recipient user agents. In addition, each of these SIP dialogues may control a media session between the calling user agent and the respective recipient user agent, the media session conveys data regarding a call to be established. Upon answering of the call by any of the respective recipient user agents, the SIP dialogue with that respective recipient user agent will become a confirmed dialogue. The SIP dialogues to the other respective recipient user agents will then seize, and with this also the media session between the calling user agent and each of the recipient user agents that have not answered the call will seize.

As explained above, a single SIP session may convey multiple SIP dialogues. In addition, it is noted that a single SIP dialogue may control multiple media sessions in the user plane. For example, a voice call may consist of a media session in the form of an RTP stream for the transfer of audio, and an associated Real-time Transport Control Protocol, RTCP, stream for controlling the audio data transfer. A video call may even consists of four respective media streams: an RTP stream for the audio, an RTCP control stream associated with the RTP audio stream, an RTP stream for video data, and an RTCP control stream associated with the video data, for example. All these media sessions, which are interrelated since they are all associated with one and the same call between two parties, may be controlled by a single SIP dialogue in a SIP session between the calling user agent and the recipient user agent.

SIP sessions and dialogues are used to set up and control communication between end points. Once a media session is established, it remains under control of the SIP dialogue under which control it was established. When a SIP dialogue ends, the related media session(s) will also end. When a User Agent, UA, terminates a SIP dialogue, that UA will also terminate the media session(s) controlled by that SIP dialogue. Likewise, when a UA receives an indication that a SIP dialogue is terminated or will be terminated, that UA will terminate the media session(s) controlled by that SIP dialogue.

As a result, while a media session is active, there must be a SIP dialogue corresponding to it. This SIP dialogue can be used to control the media session. If there is a need for a media session without the need to control this media session in any way any further by a corresponding early or confirmed dialogue, keeping the SIP dialogue active creates unnecessary overhead. This situation may, for example, occur when the media session does not require further (duration based) charging or quality control. Keeping the SIP dialogue active in that case implies that the SIP session has to have transited to the active state. Thus, the SIP session has to remain active even though there is no need for any further control of the media session that is established and controlled by the dialogue of this SIP session.

In view of the large and ever increasing amounts of (real-time) data conveyed by telecommunications networks nowadays, optimization in terms of data capacity at the networks itself and data handling capacity by servers becomes more and more important.

SUMMARY OF THE INVENTION

The present invention has for its object to overcome the above-mentioned disadvantages of the prior art, and to provide an efficient way of handling media sessions enabling increased functionality.

These and other objects are achieved, in a first aspect, in that there is provided a method of operating a first communication device for receiving a media data stream from at least one second communication device in a telecommunications system. In the method, the first communication device exchanging with the at least one second communication device one or multiple session initiation protocol messages during a session initiation protocol dialogue. The one or multiple session initiation protocol messages including a late media indicator data element. The late media indicator data element including an indication that the media stream continues after the session initiation protocol dialogue has terminated or including an indication of support of receiving media stream after the session initiation protocol dialogue has terminated. The session initiation protocol dialogue controlling the media data stream. The first communication device receiving the media data stream from the at least one second communication device, wherein the first communication device continues to receive and accept the media data stream after the session initiation protocol dialogue has ended.

The present method introduces the use of a late media indicator data element within the standard session initiation protocol for use during session initiation protocol dialogues. The late media indicator data element includes an indication that the associated media stream continues after the SIP dialogue has terminated. The associated one or more media sessions which are ongoing after termination of the SIP session may, for example, continue until one of the end points terminates the media session, through message exchange on the user plane. This may, for example, be achieved using signalling on the user plane, e.g. by means of sending an RTCP 'Bye' message.

An alternative method for ending the media data stream is to allow the one or more media streams to be ongoing for a defined duration of time, after which the media stream may be terminated by any of the end points without specific exchange of signalling for terminating the stream.

According to an example, the session initiation protocol dialogue is at least one of an unestablished session initiation protocol dialogue, an established unconfirmed session initiation protocol dialogue, and an established confirmed session initiation protocol dialogue. It will be appreciated by the skilled reader that any of the above-mentioned SIP dialogue types may have one or more associated media streams to which the method may be applied.

According to a further example, the late media indicator data element may be included in a session initiation protocol request or response message of any suitable type. The session initiation protocol message may, for example, be at least one of a group comprising a session initiation protocol request of the type "Invite", "Ack", "Bye", "Cancel", "Prack", "Info", "Refer", and "Update", or any response message on one such request message. It will be appreciated that the inclusion of a late media indicator data element is not limited to SIP messages of the above-mentioned type; any suitable type SIP message may be used to convey the late media indicator data elements, and even a new dedicated type of SIP message may be created to convey the late media indicator data element between network entities in an IMS type network.

According to a further example, the step of exchanging the SIP message comprises at least one of the first communication device sending the session initiation protocol message, or the first communication device receiving the session initiation protocol message. In order to streamline the method, it will normally be advisable for the other party to confirm the receipt and acceptance of the late media indicator data element, such that the communication device that sends the late media indicator data element is aware of the fact that late media is supported by the other communication device and will be part of the call. In addition, it will normally be advisable for the calling party to signal the support of receiving late media. It will be apparent that such a confirmation or acknowledgement of the receipt and acceptance of the late media indicator data element as mentioned above is not an essential part of the invention, but may provide benefits in an implementation of the method in a telecommunications network. Therefore, according to an other example, the method comprises a further step of the first communication device sending or receiving a session initiation protocol response message in response to the session initiation protocol message.

As will be appreciated by the person skilled in the art, there are many ways of ending the SIP dialogue, while continuing the media session(s) associated therewith. According to a further example, the step of ending of the session initiating protocol dialogue comprises at least one step of a group of: the first communication device sending or receiving a session initiation protocol 'Bye' request for terminating the dialogue; the first communication device sending or receiving a session initiation protocol 'Cancel' request for cancelling a pending session initiation protocol request, leading to the termination of the session initiation protocol dialogue; the first communication device receiving an unsuccessful final response, leading to the termination of the session initiation protocol dialogue; the first communication device receiving a successful final response related to the establishment of an associated session initiation protocol dialogue, leading to the implicit termination of the session initiation protocol dialogue; the first communication device receiving a provisional response leading to the implicit termination of the session initiation protocol dialogue; the first communication device timing out the dialogue.

In a particular example, the late media indicator data element comprises a time data value for indicating a duration of time wherein the at least one media data stream may be continued after the session initiation protocol dialogue has ended. This specific embodiment allows for automatic termination of the media session after expiry of the agreed duration of time indicated by the time data value, without the requirement of user plane signalling for ending the media data stream. There are many specific situations that this embodiment may be applied, for example in case a user contacts a server or call centre and receives an audio or video message at the end of the call, after the SIP dialogue has ended. The audio or video message may be of a known fixed duration of time. Another case is a situation wherein during a call, one of the parties involved in the call receives a data file of any of the other parties, which data file has a known file size. The media session, specifically the session for transferring the data file, may be maintained for a fixed duration of time after ending the SIP dialogue, for allowing the transfer of this specific file to the other party.

According to another example the late media indicator data element may be forwarded by a telecommunications server entity, such as a SIP Application Server, SIP AS. In this case, the first communication device sends the session initiation protocol message to a telecommunications server entity, such as a session initiation protocol application server, for the telecommunications server entity to send a further session initiation protocol message to the at least one second communication device, wherein the further session initiation protocol message comprises the late media indicator data element which was included in the session initiation protocol message sent by the first communication device to the telecommunications server entity.

The skilled person will appreciate that it is even possible to include multiple SIP application servers in the SIP communication link between the first communication device and the second communication device. This example may for instance be applied in a situation wherein a SIP proxy server applies the principle of "forking" for locating a recipient user agent by searching on multiple locations. Of course, also other situations may exist wherein the sending or the forwarding of the late media indicator data element by inclusion thereof in a further SIP message by a telecommunications server may be applied. Sending may, for example, relate to the case where the SIP AS adds the late media data element; and forwarding may for example relate to the case where the calling party provides the late media data element and the SIP AS forwards it—although these latter two examples are not to be interpreted as being the only possibilities foreseen, but they are to be understood as mere examples for illustrative purposes.

In accordance with another example, the method further comprises a step of the first communication device sending a capability verification indicator data element to the at least one second communication device or to a telecommunications server entity in the telecommunications system. The capability verification indicator data element includes an indication of the first communication device being capable of handling the late media indicator data element. This allows the at least one second communication device or the intermediate telecommunications server entity to gain information on whether or not the first communication device is capable of handling late media in accordance with the present method.

According to a second aspect there is provided a communication device comprising a communication unit for sending to or receiving from at least one other communication device a session initiation protocol message during a session initiation protocol dialogue, and a control unit for processing a late media indicator data element included in the session initiation protocol message. The communication unit is further arranged for receiving a media data stream from the at least one other communication device and wherein the control unit is arranged for instructing the communication unit to continue to receive the media data stream after the session initiation protocol dialogue has ended, as agreed between the communication device and the at least one other communication device in accordance with the late media indicator data element.

According to a third aspect there is provided a telecommunications server for use in the method, wherein the telecommunications server comprises a session monitoring unit for monitoring a session initiation protocol dialogue facilitated through the telecommunications server between a first communication device and at least one second communication device. The session monitoring unit is arranged for determining whether a late media indicator data element has been exchanged within the session initiation protocol dialogue. The session monitoring unit is arranged for instructing a server control unit to maintain an ongoing media data stream exchanged between the first and the second communication device if the session monitoring unit has determined that the late media indicator data element has been exchanged within the session initiation protocol dialogue.

According to a fourth aspect there is provided a telecommunications system comprising a first communication device and a second communication device, wherein the first communication device comprises a communication unit for receiving a media data stream. The media data stream is provided by a communication unit of the second communication device in the telecommunications system. The communication unit of the first communication device is arranged for exchanging with the at least one second communication device a session initiation protocol message during a session initiation protocol dialogue for controlling the media data stream. The session initiation protocol message includes a late media indicator data element. The late media indicator data element including an indication that the media stream continues after the session initiation protocol dialogue has terminated. The communication unit of the first communication device is further arranged for receiving the media data stream from the at least one second communication device, and wherein the communication unit of the first communication device is arranged for continuing to receive and accept the media data stream after the session initiation protocol dialogue has ended. The telecommunications system comprises a telecommunications server, and wherein the telecommunications server comprises a session monitoring unit for monitoring the session initiation protocol dialogue which is facilitated through the telecommunications server between the first communication device and the second communication device. The session monitoring unit is arranged for determining whether the late media indicator data element has been exchanged within the session initiation protocol dialogue, and wherein the session monitoring unit is arranged for instructing a server control unit of the telecommunications server to maintain an ongoing media data stream exchanged between the first and the second communication devices if the session monitoring unit has determined that the late media indicator data element has been exchanged within the session initiation protocol dialogue.

BRIEF DESCRIPTION OF THE DRAWINGS

The principals of the present invention will further be explained with reference to the attached drawings, wherein.

DETAILED DESCRIPTION

Figure 1:
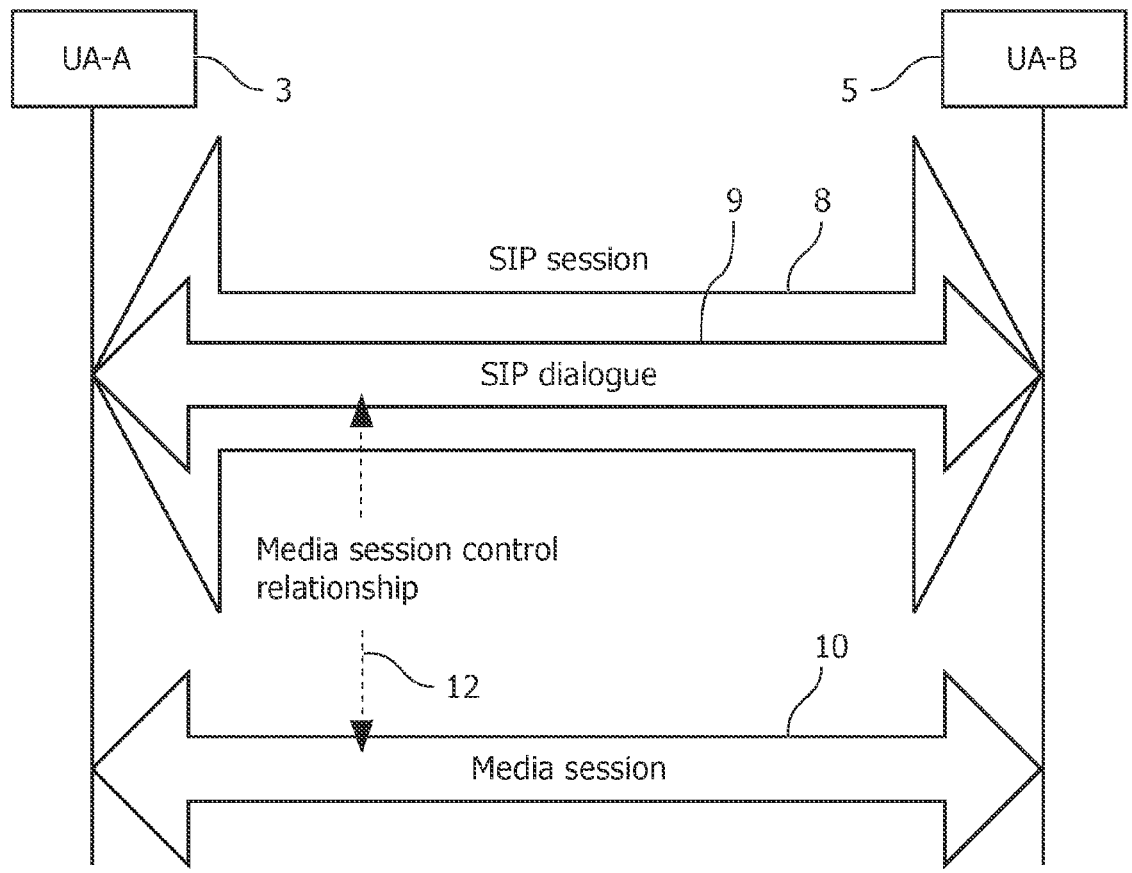
FIG. 1 schematically illustrates the conventional relation between the SIP dialogue, a SIP session and a media session according to the prior art.
Figure 2:
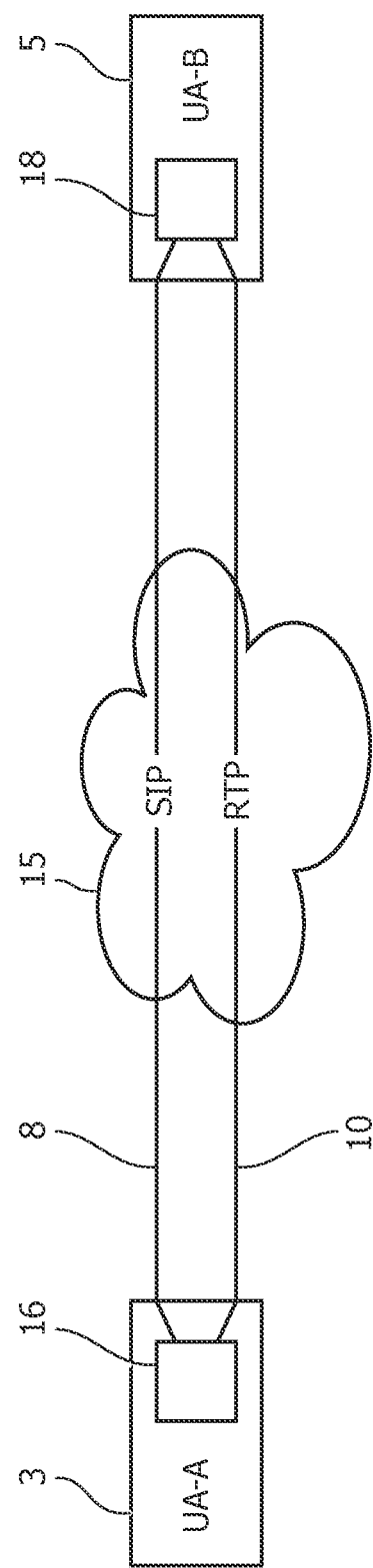
FIG. 2 schematically illustrates the principle of using a control plane and a user plane in accordance with the prior art using SIP.
Figure 3:
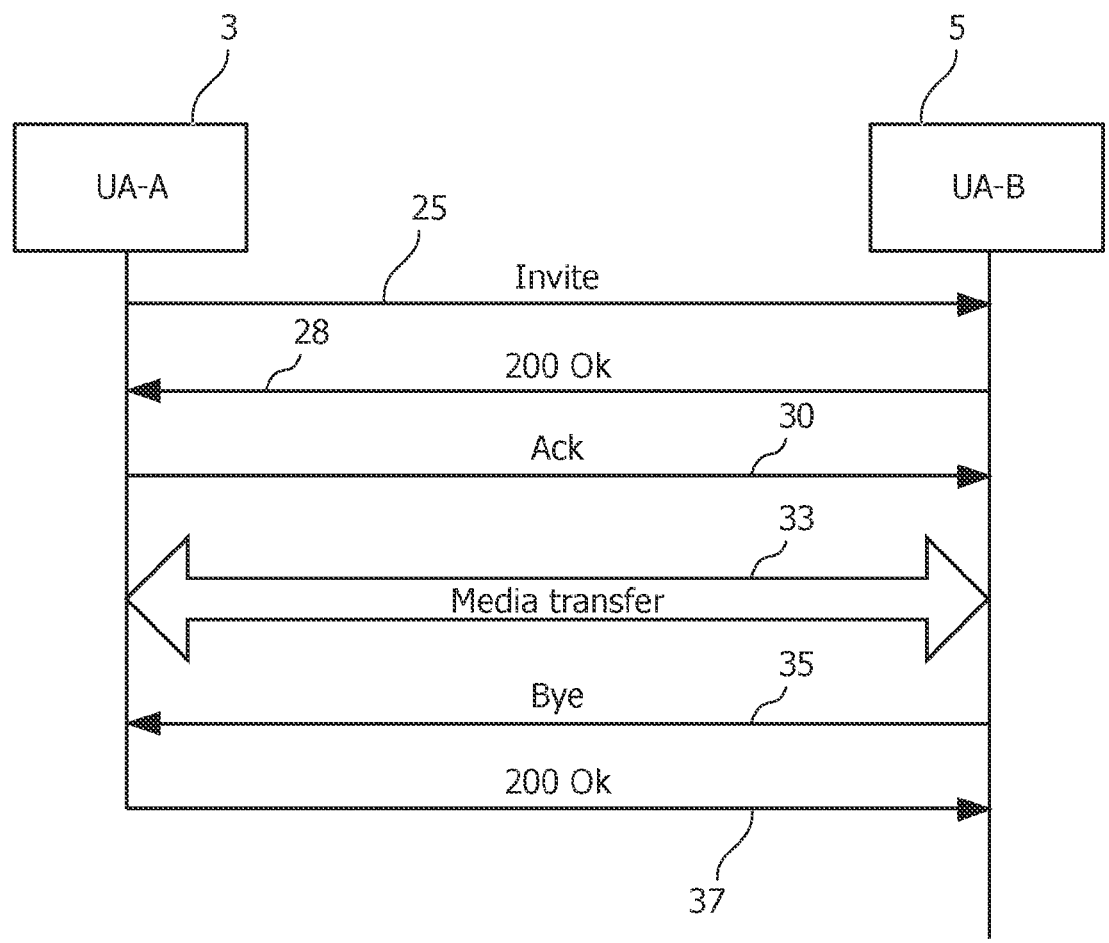
FIG. 3 illustrates a communication scheme between two user agents according to the prior art.

FIG. 3 illustrates a prior communication session between a first User Agent, UA-A, 3 and a second User Agent, UA-B,5. Communication steps 25, 28, 30, 35 and 37 are part of the Session Initiation Protocol, SIP, dialogue between user agent 3 and user agent 5. Double arrow 33 indicates communication within the media data session on the user plane. The communication session illustrated in FIG. 3 is a very common and plane communication session involving SIP signalling in the control plane and regular media data session in the user plane.

The communication session in FIG. 3 starts with a SIP Invite message in step 25, being provided by user agent UA-A 3 to user agent UA-B 5. UA-B 5 responds to the receipt of the SIP Invite message by sending a '200 Ok' message in step 28 back to UA-A 3. An acknowledgement message is sent within the SIP dialogue in step 30 from UA-A 3 to UA-B 5. The SIP dialogue is now an established confirmed SIP dialogue, and a media data transfer stream between user agent UA-A 3 and user agent UA-B 5 may now commence. This is indicated in FIG. 3 by step 33.

During the two-way media data stream between UA-A 3 and UA-B 5, the SIP dialogue between UA-A 3 and UA-A 5 will remain active. At the end of the call between user agent 3 and user agent 5, the SIP dialogue is terminated in the given example by user agent UA-B 5 providing a SIP 'Bye' type message in step 35 to user agent UA-A 3. User agent 3 responds within the SIP dialogue session by providing a '200 Ok' message in step 37 to user agent 5. After this, the SIP dialogue is terminated, and hence the media data transfer stream is ceased.

Figure 5:
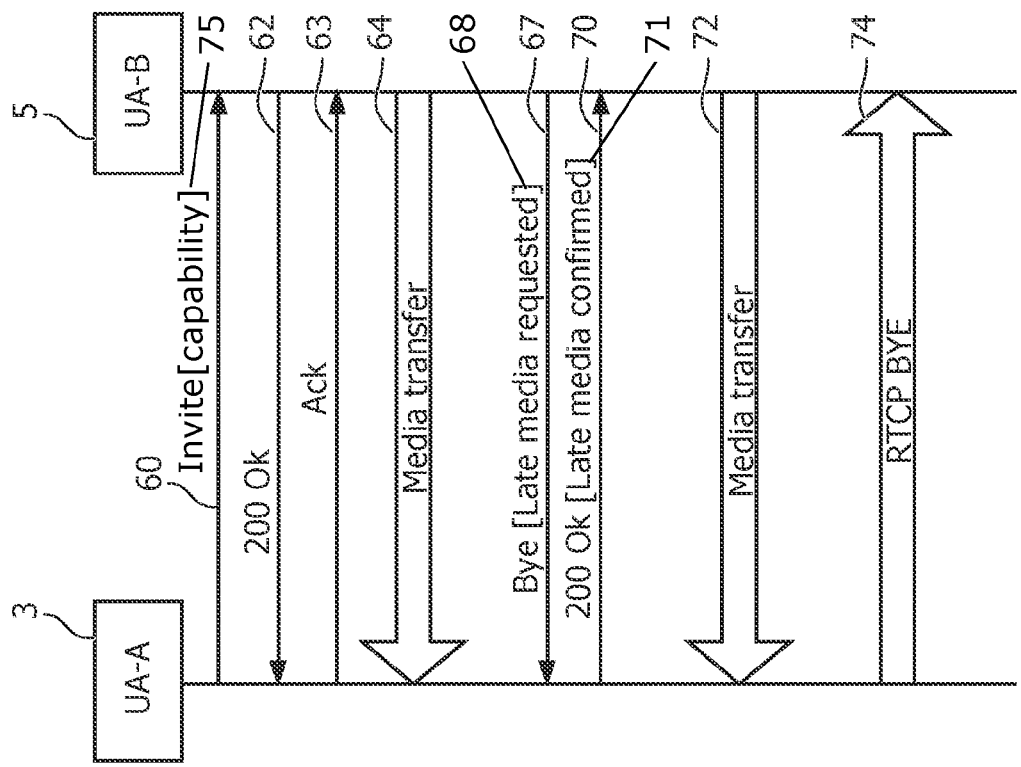
FIG. 5 illustrates a communication scheme in accordance with a further embodiment of the method of the present invention.

An alternative to the prior art communication session illustrated in FIG. 3 is the communication session illustrated in FIG. 5, wherein the method of the present invention is applied. In FIG. 5, user agent UA-A 3 sends a SIP 'Invite' message to user agent UA-B 5 in step 60. User agent 5 responds to user agent 3 by sending a '200 Ok' message 62 back to UA-A 3. An acknowledgement 'Ack' is provided by user agent 3 to user agent 5 in step 63, after which the SIP dialogue is an established confirmed SIP dialogue. After this, the transfer of a media data stream between user agent 3 and user agent 5 (two-way data stream) may commence, as is schematically illustrated by step 64.

Suppose, in accordance with the present invention, that no further SIP signalling is required for the present media data stream between user agent 3 and user agent 5, after the call is answered. In accordance with the present invention, user agent UA-B 5 terminates the session initiation protocol dialogue by sending a 'Bye' request which includes a late media indicator data element 68, schematically shown between right brackets in step 67. User agent UA-A 3 receives the late media indicator data element 68 and responds by providing a '200 Ok' SIP message in step 70, including a confirmation by the late media indicator data element 71, likewise shown between right brackets. The SIP dialogue will now be terminated between user agent 3 and user agent 5. However, the media data stream continues after termination of the SIP dialogue, as illustrated by double arrow 72. At any time, the media data stream may be terminated by any of user agents 3 and 5 by providing an RTCP Bye command via signalling on the user plane, using a Real-time Transport Control Protocol, RTCP. This is indicated in step 74.

Figure 4:
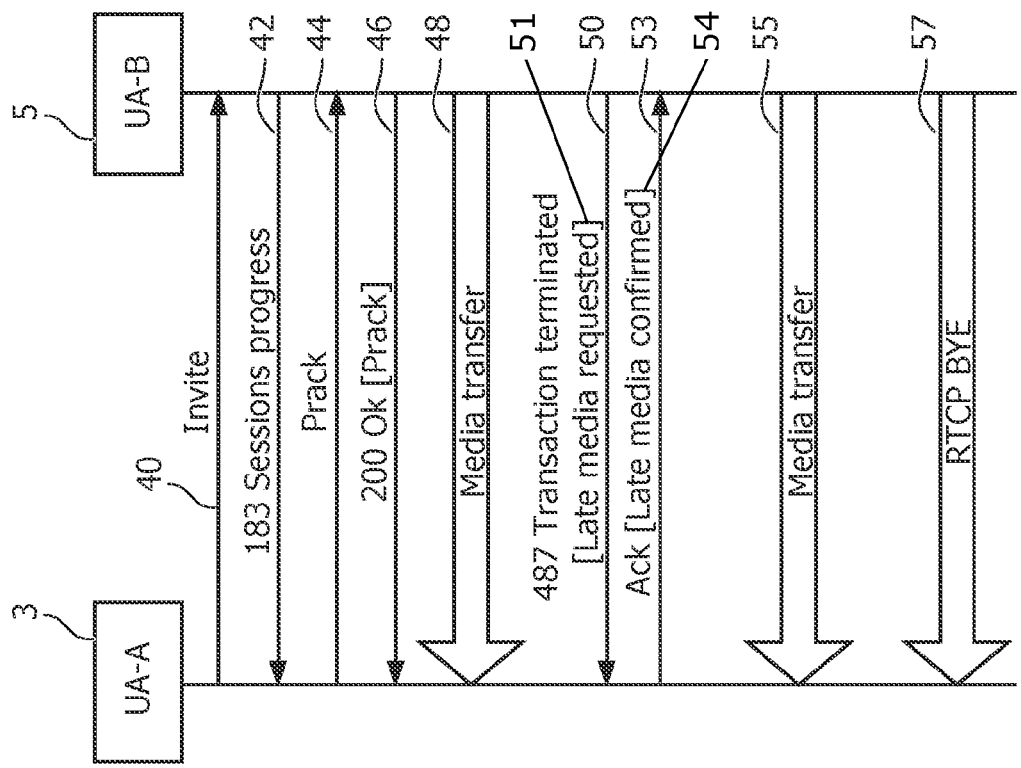
FIG. 4 illustrates a communication scheme between two user agents according to a method of the present invention.

FIG. 4 discloses another embodiment of the present invention. In FIG. 4, the transfer of a media data stream through an early dialogue takes place. The media is associated with and controlled by the early SIP dialogue that is established for the Invite transaction. The media data stream transfer is therefore referred to as 'early media'. Early media relates to the ability of two user agents to exchange media before a call is actually established. Support for early media is important within SIP both for interoperability with the Public Switched Telephone Network, PSTN, and for billing purposes. The skilled person will appreciate that early media enables a large number of other functionality. Example may, for example, be to provide a call establishment progress message (announcement) to the user of user agent UA-A 3.

In FIG. 4, UA-A 3 sends a SIP 'Invite' message in step 40 to UA-B 5. In step 42, UA-B 5 sends back a '183 Session progress' message to UA-A 3. This is provisionally acknowledged, i.e. Provisional Response Acknowledgement, PRACK, in step 44 by UA-A 3, which receives back a '200 Ok' message in step 46 from UA-B 5. In step 48, media transfer from UA-B 5 to UA A 3 starts in the user plane. In step 50, UA-B 5 sends a '487 transaction terminated' message to UA-A 3, wherein a late media indicator data element 51 in the form of a request is included, schematically shown between right brackets. In step 53, UA-A 3 acknowledges the termination, and confirms 54 the late media support. After the SIP session has ended, media transfer continues in step 55. The media transfer is stopped by UA-B 5 sending an RTCP 'Bye' command 57 using signalling on the user plane. As will be appreciated, the initiative of terminating the late media transfer of step 55 may also be taken by UA-A 3 by sending an RTCP 'Bye' instruction to UA-B 5 in an alternative embodiment.

Figure 6:
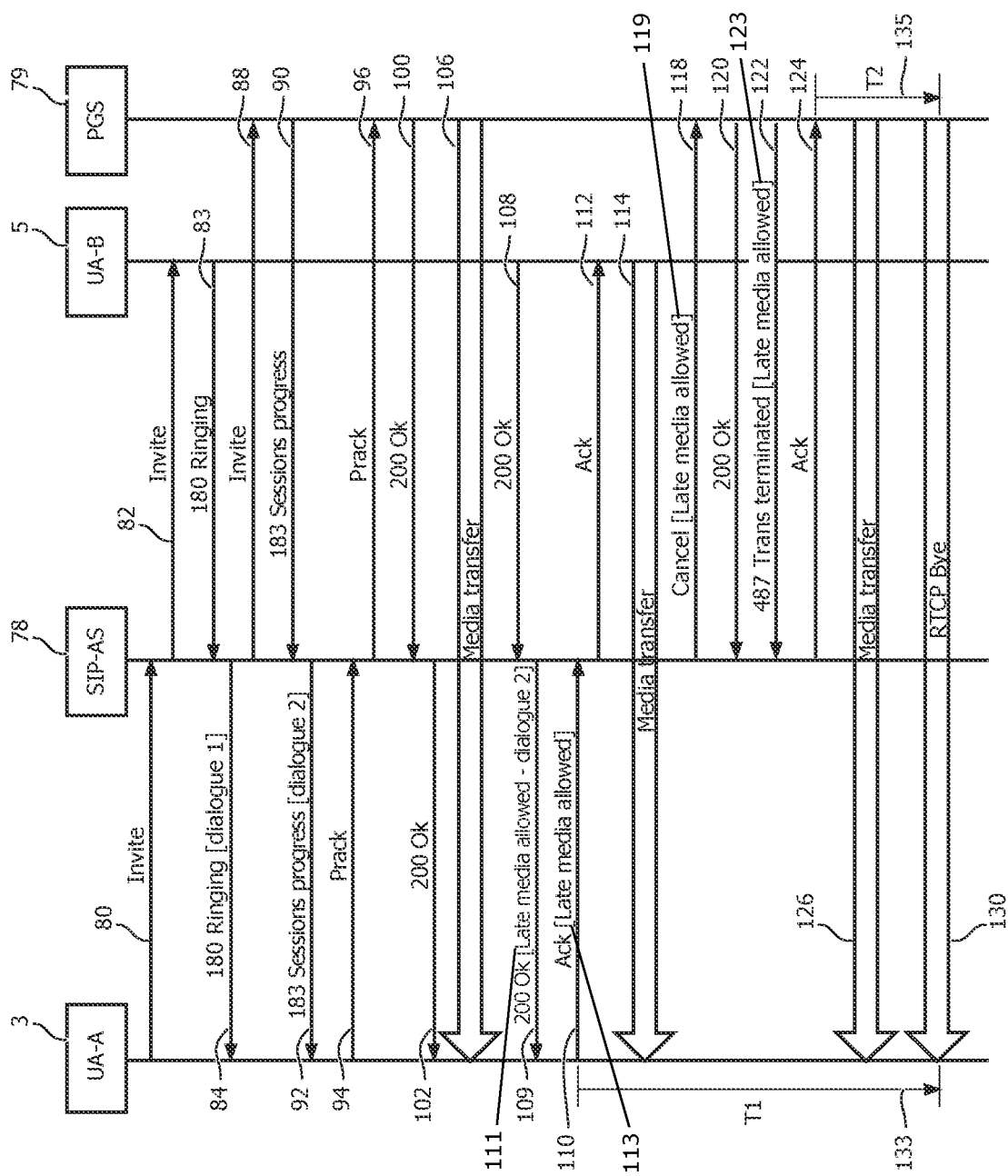
FIG. 6 illustrates a communication scheme between multiple involved parties applying an embodiment of the method of the present invention.

In FIG. 6 there is disclosed a further embodiment of the method of the present invention. In this embodiment, a call is established by UA-A 3 towards UA-B 5. The call towards UA-B 5 is subject to a SIP service, executed from a SIP type Application Server, SIP-AS, 78 that is acting on behalf of UA-B 5. The SIP service establishes two downstream SIP dialogues: (1) SIP dialogue towards UA-B 5 and (2) another SIP dialogue towards a Personal Greeting Service, PGS. UA-A 3 will hence receive provisional responses related to two SIP dialogues: dialogue #1 established by UA-B 5; dialogue #2 established by PGS. PGS applies early media; it uses reliable provisional response hereto i.e. steps 94, 96, 100 and 102, including confirmation.

In FIG. 6, a SIP 'Invite' message 80 is sent to SIP-AS 78 which forwards 82 the 'Invite' message to UA-B 5. In steps 83 and 84 '180 Ringing', an indication is provided to UA-A 3 that AU-B 5 has been reached, but the call has not yet been established. In steps 88 'Invite', 90 '183 Sessions progress' and 92 '183 Sessions progress', the session towards the PGS 79 is established by SIP-AS 78, and confirmed to UA-A 3, i.e. step 92. Provisional acknowledgement 'PRACK' messages 94 and 96 are followed by respective '200 Ok' messages in steps 100, 102. Media stream data transfer 106 from PGS 79 to UA-A 3 commences in step 106; the user of UA-A 3 receives a personal greeting or welcome message such as audio, video, or another type of data stream through the user plane.

When UA-B 5 answers the call, in step 108, the SIP-AS 78 forwards the '200 Ok' from UA-B 5 to UA-A 3, i.e. step 109, and in doing so, instructs UA-A 3 by providing a late media indicator data element 111 in step 109 '200 Ok', to allow late media with respect to the media session related to SIP dialogue #2. This is acknowledged by UA-A 3 in steps 110 'Ack' and 112 'Ack' with SIP-AS 78, by a late media allowed indicator data element 113. Media stream data transfer from UA-B 5 to UA-A 3 commences in step 114. SIP-AS 78 also cancels the dialogue towards PGS 79 in 'Cancel' step 118, and instructs PGS 79 to allow late media by sending a late media indicator data element 119. After the transmission of a '200 Ok' message in step 120 termination of the dialogue and transmission by the PGS 79 is signaled to the SIP-AS 78 in step 122, including a confirmation of the allowance of late media by a late media indicator element 123, which message is acknowledged in 'Ack' step 124. Media stream data transfer from PGS 79 to UA-A 3 commences in step 126. The media transfer is stopped by PGS 79 sending an RTCP 'Bye' command 130 using signalling on the user plane.

The duration for which UA-A 3 shall be allowed to receive media from dialogue #2 PGS 79 is denoted T1 by arrow 133; the duration for which PGS 79 shall be allowed to send media towards UA-A 3 is denoted T2 by arrow 135. T1 shall be slightly longer than T2, to ensure that no media from PGS 79 is lost.

This embodiment can e.g. be used to improve a Personal Greeting Service. Normally, a personal greeting is ended when UA-B 5 answers. This embodiment, with a late media session which lasts for time T2, gives the possibility to mix, for finite (small) duration, the two media streams (that is, media stream from called party and media stream from PGS server) and do a fade-out of the greeting.

Functional entities in a telecommunications system that wish to use the late media feature according to the invention, may shall verify that another involved functional entity/ entities support this feature. As shown by way of example between right brackets in FIG. 4, support of this feature, in an example, is signaled through enhancement to existing mechanism for reporting capability support in a SIP session. For example, when an entity such as a first communication device or user agent UA-A 3 sends an 'Invite request' message to, for example, an entity such as a second communication device or user agent UA-B 5, and/or to a telecommunications server entity in the telecommunications system, the UA-A 3 includes a capability verification indicator data element 75. This capability verification indicator data element 75 includes an indication of the first communication device or UA-A 3 being capable of supporting the handling of the late media indicator data element 68.

Thus, the UA or communication device sending the Invite request indicates that it supports Late media. Hence, it has the capability to receive e.g. a final response including an indication that late media shall be applied for a particular dialogue. Likewise, the support for late media may be signaled in provisional or final response message, for example.

Figure 7:
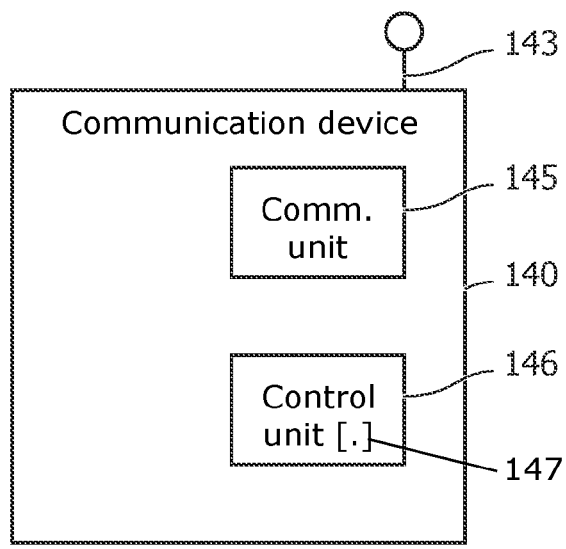
FIG. 7 schematically illustrates a communication device in accordance with the second aspect of the present invention.

FIG. 7 illustrates a communication device according to the present invention. The communication device illustrated in FIG. 7 is a mobile communication device comprising a mobile antenna 143 for communicating with a mobile access point (not shown). The communication device 140 comprises a communication unit 145 and a control unit 146. The communication unit is arranged for sending and receiving session initiation protocol messages on the control plane, and for sending and receiving a data stream on a user plane. The control unit is arranged for controlling the operation of the mobile communication unit 140, and is amongst others arranged for processing a late media indicator element 147 received in a session initiation protocol message. It shall be understood that, although FIG. 7 depicts a mobile device, the invention is equally applicable to non-mobile devices.

The control unit 146 is also arranged for instructing the communication unit to continue to receive the media data stream after a SIP dialogue within a SIP session has ended, in accordance with the late media indicator element 147.

Figure 8:
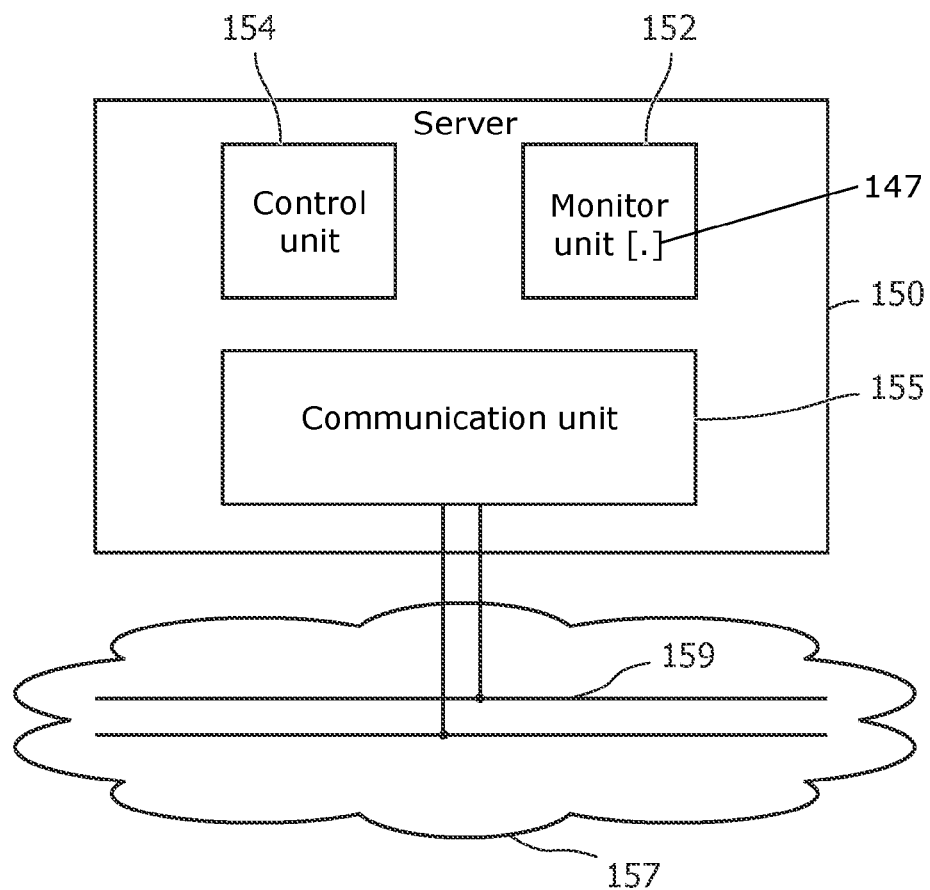
FIG. 8 schematically illustrates a telecommunications server in accordance with the third aspect of the present invention.

FIG. 8 schematically illustrates a telecommunications server according to the present invention. The telecommunications server 150 comprises a session monitoring unit 152 which is arranged for monitoring a session initiation protocol in order to determine whether a late media indicator data element 147 has been exchanged. The server also comprises a control unit 154 which is arranged for maintaining an ongoing media data stream between the first and the second communication device in the case that the session monitoring unit 152 has determined that a late media indicator date element 147 has been exchanged. In addition, the telecommunications server comprises a communication unit 155 arranged for communication on the physical data links 159 of the data communications network 157.

Figure 9:
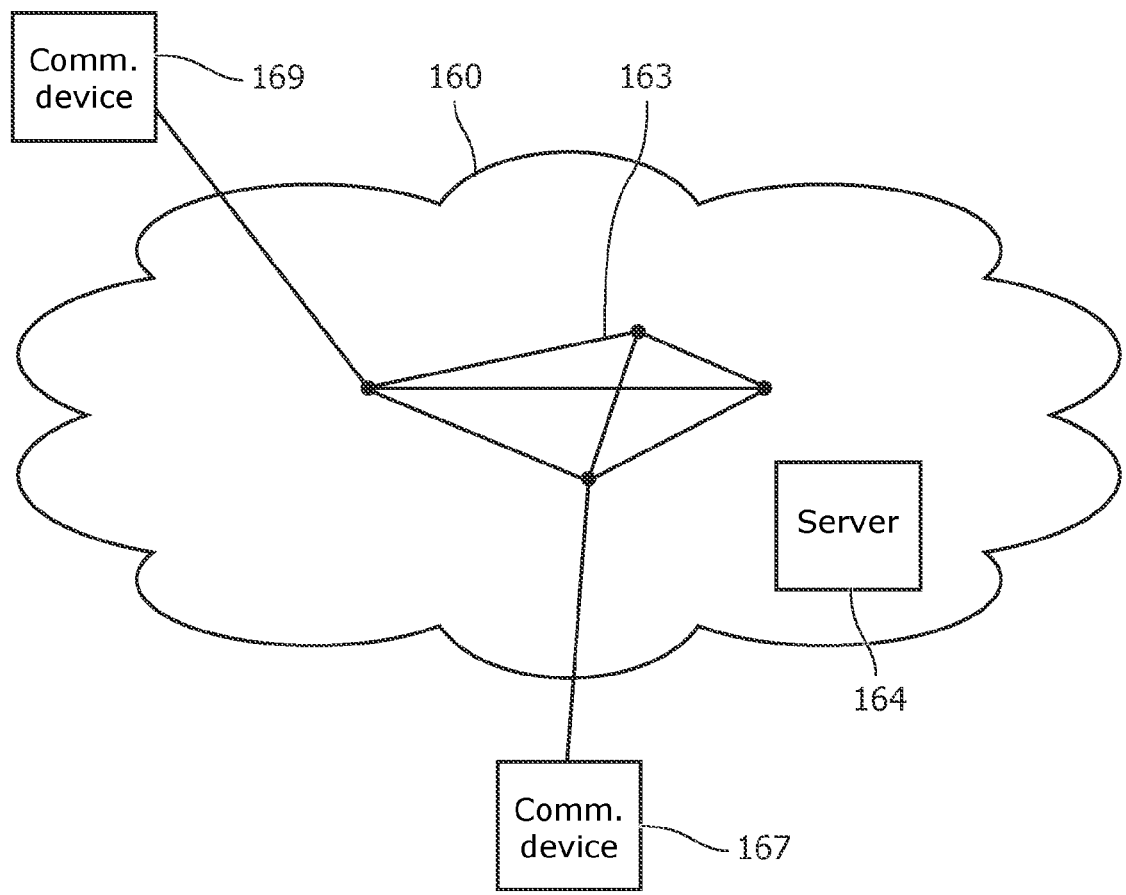
FIG. 9 schematically illustrates a telecommunications system in accordance with the fourth aspect of the present invention.

FIG. 9 illustrates a telecommunications system according to the present invention. The telecommunications system comprises a telecommunications network 160. The telecommunications network 160 includes a plurality of interconnected network nodes 163 where telecommunications network 160 is or includes at least an Internet Protocol IP type network, such as an IP Multimedia Subsystem, IMS, type network. The telecommunications system comprises a first communication device 167 and a second communication device 169. The first communication device 167 is arranged for receiving a media data stream from the second communication device 169. Both the first communication device 167 and the second communication device 169 comprise a communication unit, as is shown in the communication device illustrated in FIG. 7. Not only these communication units are arranged for exchanging data through the telecommunications network 160 with other communication devices, e.g. as part of a media data stream in the user plane, but these communication units are also arranged for exchanging Session Initiation Protocol, SIP, messages during a SIP dialogue within a SIP session in the control plane. Communication units of devices 167 and 169 are further arranged to include a late media indicator data element in such a SIP message, or to process such a late media indicator data element in case it is received in an inbound SIP message, as indicated in FIGS. 4, 5, 6, for example. The telecommunications system of FIG. 9 further comprises a telecommunications server 164 connected to one of the network nodes of the schematically illustrated physical network 163. The telecommunications server 164 is similar to the telecommunications server 150 illustrated in FIG. 8. It comprises a session monitoring unit 152 and a server control unit 154, and is arranged for exchanging data through the telecommunications network 160 using a communication unit such as communication unit 155, with reference to FIG. 8.

The first communication unit 167 may set up a SIP dialogue through telecommunication server 164 with the second telecommunication unit 169. Within this SIP dialogue, the first communication unit 167 or the second communication unit 169 may exchange the late media indicator data element within a SIP message as indicated in FIGS. 4, 5, 6, for example. The session monitoring unit 152 of the telecommunication unit 164 is arranged for detecting the sending of such late media indicator date element and is further arranged for instructing the server control unit 154 to maintain an ongoing media data stream which is exchanged between the first and second communication device in response to receiving or detecting the late media indicator data element exchanged between the communication devices 167 and 169.

The skilled person will appreciate that the invention is not limited by the specific embodiments described within this specification and illustrated in the drawings, but may be practised otherwise. The scope of the invention is only determined by the appended claims.

The invention claimed is:

1. A method of operating a first communication device for receiving a media data stream from at least one second communication device in a telecommunications system, said method comprising the steps of:
   said first communication device exchanging with said at least one second communication device a session initiation protocol message during a session initiation protocol dialogue, said session initiation protocol message including a late media indicator data element, said late media indicator data element including an indication that said media stream continues after said session initiation protocol dialogue has terminated, said session initiation protocol dialogue controlling said media data stream; and
   said first communication device receiving said media data stream from said at least one second communication device;
   wherein, in accordance with said late media indicator data element, said first communication device continues to receive and accept said media data stream after said session initiation protocol dialogue has ended.

2. The method according to claim 1, wherein said session initiation protocol dialogue is at least one of an unestablished session initiation protocol dialogue, an established unconfirmed session initiation protocol dialogue, and an established confirmed session initiation protocol dialogue.

3. The method according to claim 1, wherein said session initiation protocol message is at least one of a group comprising: a session initiation protocol request of a type 'Invite', 'Ack', 'Bye', 'Cancel', 'Prack', 'Info', 'Refer', and 'Update'; and a response message related to any of the request messages.

4. The method according to claim 1, wherein said step of exchanging said session initiation protocol message comprises at least one of said first communication device sending said session initiation protocol message, or said first communication device receiving said session initiation protocol message.

5. The method according to claim 1, further comprising a step of said first communication device sending or receiving a session initiation protocol response message in response to said session initiation protocol message.

6. The method according to claim 1, wherein ending said session initiation protocol dialogue comprises at least one of the following actions:
   said first communication device sending or receiving a session initiation protocol 'Bye' request for terminating said dialogue;
   said first communication device sending or receiving a session initiation protocol 'Cancel' request for cancelling a pending session initiation protocol request, leading to the termination of said session initiation protocol dialogue;
   said first communication device receiving an unsuccessful final response, leading to the termination of said session initiation protocol dialogue;
   said first communication device receiving a successful final response related to the establishment of an associated session initiation protocol dialogue, leading to the implicit termination of said session initiation protocol dialogue;
   said first communication device receiving a provisional response leading to the implicit termination of said session initiation protocol dialogue; and
   said first communication device timing out said dialogue.

7. The method according to claim 1, wherein said late media indicator data element comprises a time data value for indicating a duration of time wherein said media data stream may be continued after said session initiation protocol dialogue has ended.

8. The method according to claim 1, wherein said first communication device sends said session initiation protocol message to a telecommunications server entity, for said telecommunications server entity to send a further session initiation protocol message to said at least one second communication device, said further session initiation protocol message comprising said late media indicator data element.

9. The method according to claim 1, further comprising a step of said first communication device sending a capability verification indicator data element to said at least one second communication device or to a telecommunications server entity in said telecommunications system, wherein said capability verification indicator data element includes an indication of the first communication device being capable of supporting the handling of said late media indicator data element.

10. A communication device comprising:
   a communication unit configured to send to or receive from at least one other communication device a session initiation protocol message during a session initiation protocol dialogue;
   a control unit configured to process a late media indicator data element included in said session initiation protocol message;
   wherein said communication unit is further configured to receive a media data stream from said at least one other communication device; and
   wherein said control unit is further configured to instruct said communication unit to continue to receive said media data stream after said session initiation protocol dialogue has ended, as agreed between said communication device and said at least one other communication device in accordance with said late media indicator data element.

11. The communication device according to claim 10, wherein said communication unit is configured to continue to receive said media data stream for a defined period of time after said session initiation protocol dialogue has ended, wherein said defined period of time corresponds to a time data value comprising said late media indicator data element.

12. The communication device according to claim 10, wherein said communication device is a mobile or wireline personal communication device.

13. A telecommunications server configured for operation in a telecommunications system and comprising:

a session monitoring unit configured to monitor a session initiation protocol dialogue facilitated through said telecommunications server between a first communication device and at least one second communication device, and to determine whether a late media indicator data element has been exchanged within said session initiation protocol dialogue; and wherein said session monitoring unit is further configured to instruct a server control unit to maintain an ongoing media data stream exchanged between said first and said second communication device, if said session monitoring unit has determined that said late media indicator data element has been exchanged within said session initiation protocol dialogue.

14. The telecommunications server according to claim 13, wherein said server is a Session Initiation Protocol Proxy Server, a Media Resource Function or a Session Initiation Protocol Application Server in an Internet Protocol Multimedia Subsystem telecommunications system.

15. A telecommunications system comprising:
a first communication device;
a second communication device; and
a telecommunications server;
wherein said first communication device comprises a communication unit configured to receive a media data stream, wherein said media data stream is provided by a communication unit of said second communication device;
wherein said communication unit of said first communication device is further configured to exchange with said at least one second communication device a session initiation protocol message during a session initiation protocol dialogue for controlling said media data stream, said session initiation protocol message including a late media indicator data element, said late media indicator data element including an indication that said media stream continues after said session initiation protocol dialogue has terminated;

wherein said communication unit of said first communication device is further configured to receive said media data stream from said at least one second communication device, and wherein, in accordance with said late media indicator data element, said communication unit of said first communication device is configured to continue to receive and accept said media data stream after said session initiation protocol dialogue has ended; and wherein said telecommunications server includes a session monitoring unit that is configured to:
monitor said session initiation protocol dialogue which is facilitated through said telecommunications server between said first communication device and said second communication device;
determine whether said late media indicator data element has been exchanged within said session initiation protocol dialogue; and
instruct a server control unit of said telecommunications server to maintain an ongoing media data stream exchanged between said first and said second communication devices, if said session monitoring unit determines that said late media indicator data element has been exchanged within said session initiation protocol dialogue.

\* \* \* \* \*